United States Patent
Avedisov et al.

(10) Patent No.: US 12,281,907 B2
(45) Date of Patent: Apr. 22, 2025

(54) PARKING LOT AWARENESS ASSISTANCE USING CONNECTED VEHICLE COOPERATION

(71) Applicant: Toyota Motor Engineering & Manufacturing North America, Inc., Plano, TX (US)

(72) Inventors: Sergei S. Avedisov, Mountain View, CA (US); Onur Altintas, Mountain View, CA (US); Takamasa Higuchi, Mountain View, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 553 days.

(21) Appl. No.: 17/516,837

(22) Filed: Nov. 2, 2021

(65) Prior Publication Data
US 2023/0137808 A1 May 4, 2023

(51) Int. Cl.
*G01C 21/34* (2006.01)
*G08G 1/16* (2006.01)

(52) U.S. Cl.
CPC ......... *G01C 21/3461* (2013.01); *G08G 1/166* (2013.01)

(58) Field of Classification Search
CPC .... G01C 21/3461; G08G 1/166; G08G 1/163; G08G 1/162
See application file for complete search history.

(56) References Cited

U.S. PATENT DOCUMENTS

| | | | |
|---|---|---|---|
| 8,224,370 B2 | 7/2012 | Miucic | |
| 8,520,695 B1 | 8/2013 | Rubin et al. | |
| 10,621,858 B1* | 4/2020 | DeCastro | G02B 27/017 |
| 10,789,848 B2 | 9/2020 | Altinas et al. | |
| 10,873,876 B2 | 12/2020 | Higuchi et al. | |
| 10,896,609 B2 | 1/2021 | Higuchi et al. | |
| 2010/0164789 A1 | 7/2010 | Basnayake | |
| 2018/0326982 A1* | 11/2018 | Paris | B60W 30/18154 |
| 2019/0138007 A1* | 5/2019 | Baghsorkhi | G08G 1/16 |
| 2019/0164430 A1* | 5/2019 | Nix | B60R 11/04 |
| 2020/0117926 A1 | 4/2020 | Kim | |
| 2021/0211851 A1 | 7/2021 | Higuchi et al. | |
| 2021/0218692 A1 | 7/2021 | Higuchi et al. | |
| 2021/0284131 A1* | 9/2021 | Max | G05D 1/0214 |

FOREIGN PATENT DOCUMENTS

| | | |
|---|---|---|
| CN | 111284394 A | 6/2020 |
| JP | 2004240805 A | 8/2004 |

* cited by examiner

*Primary Examiner* — Ig T An
(74) *Attorney, Agent, or Firm* — Dinsmore & Shohl LLP

(57) ABSTRACT

In accordance with one embodiment of the present disclosure, a vehicle system includes a controller. The controller may be programmed to perform operations including identifying a subject in a conflict zone in a parking area by a sensor, determining a trajectory of a vehicle and a trajectory of the subject, determining a suggested trajectory for the vehicle based on a comparison of the trajectory of the vehicle and the trajectory of the subject, and transmitting the suggested trajectory to the vehicle.

18 Claims, 8 Drawing Sheets

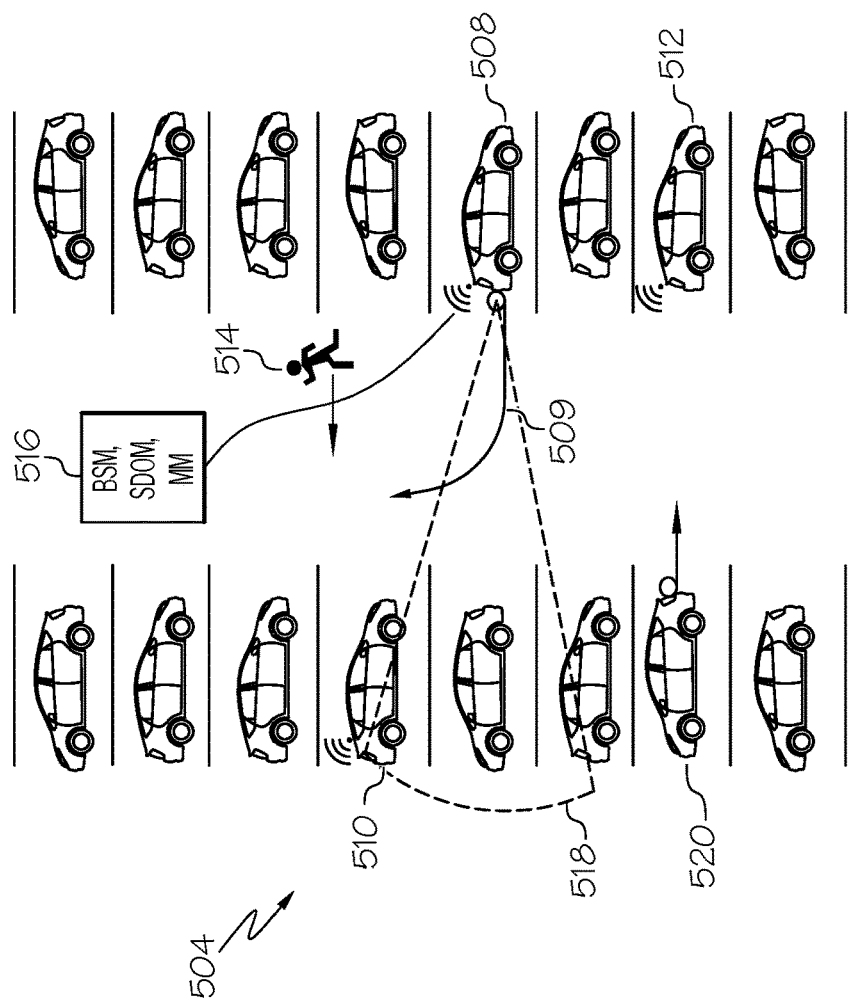
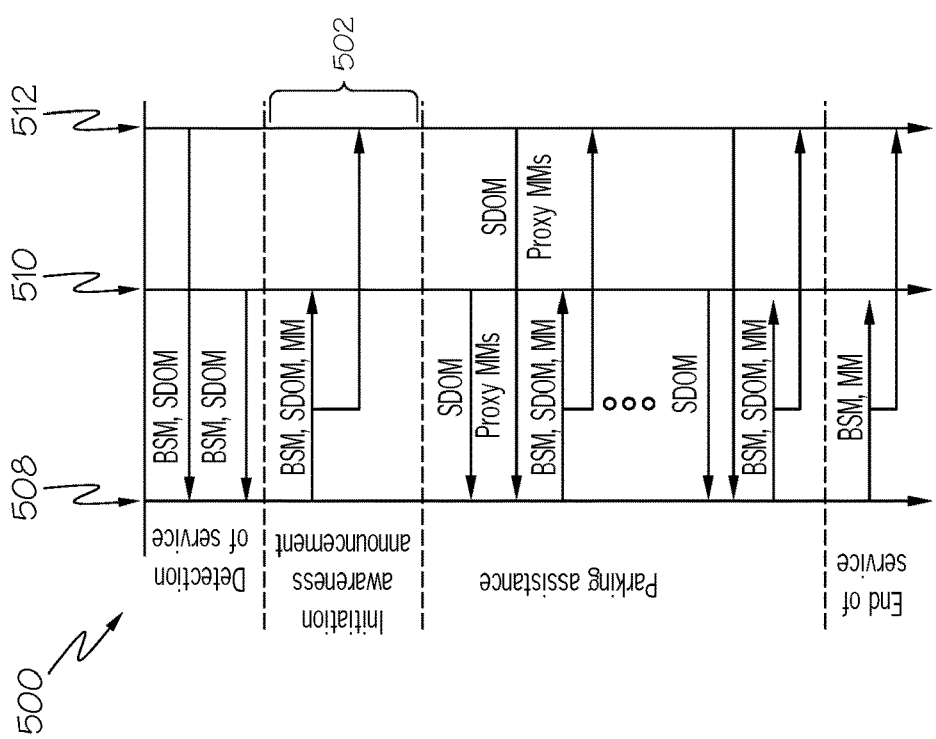
FIG. 5B
FIG. 5A

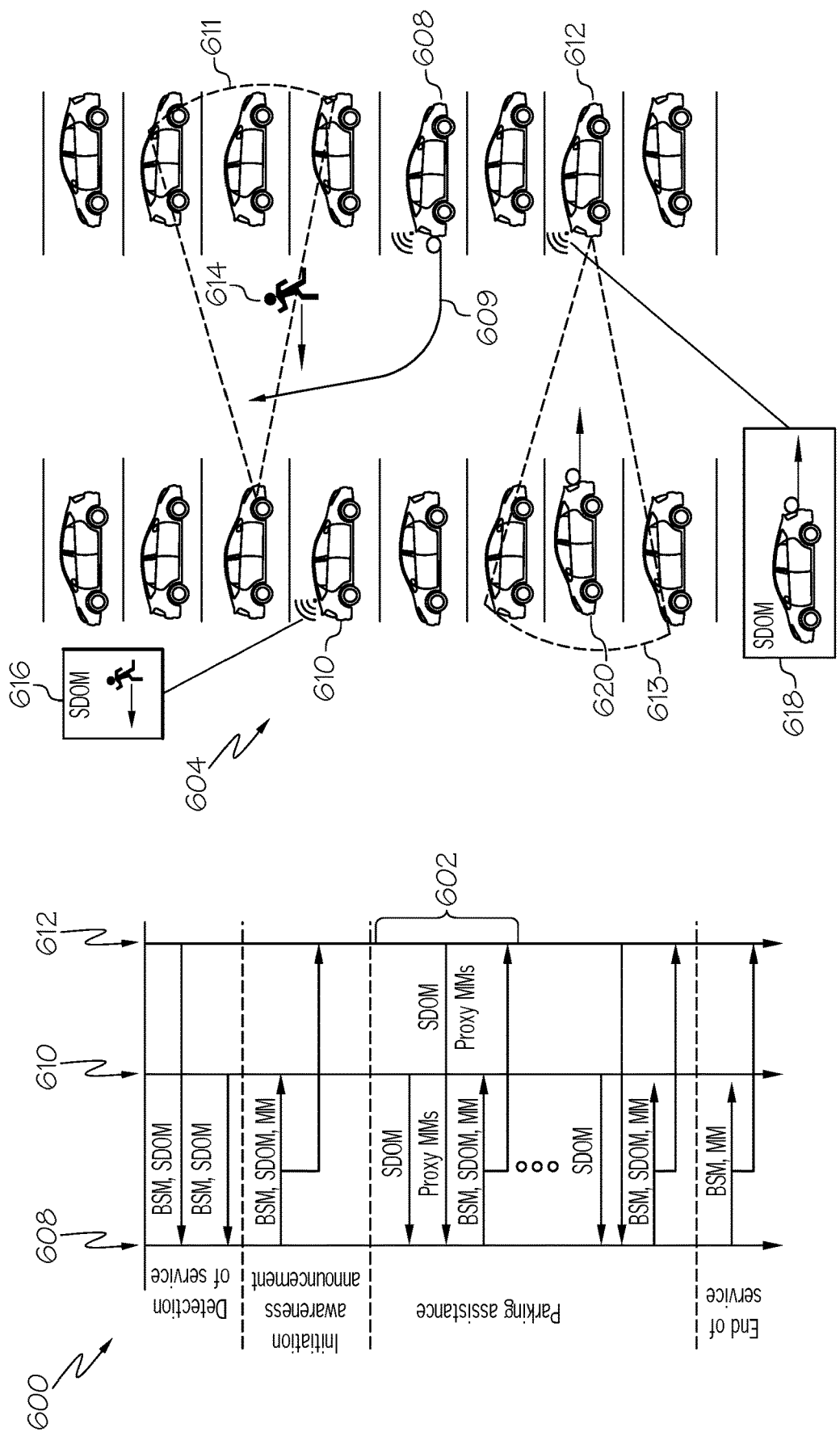

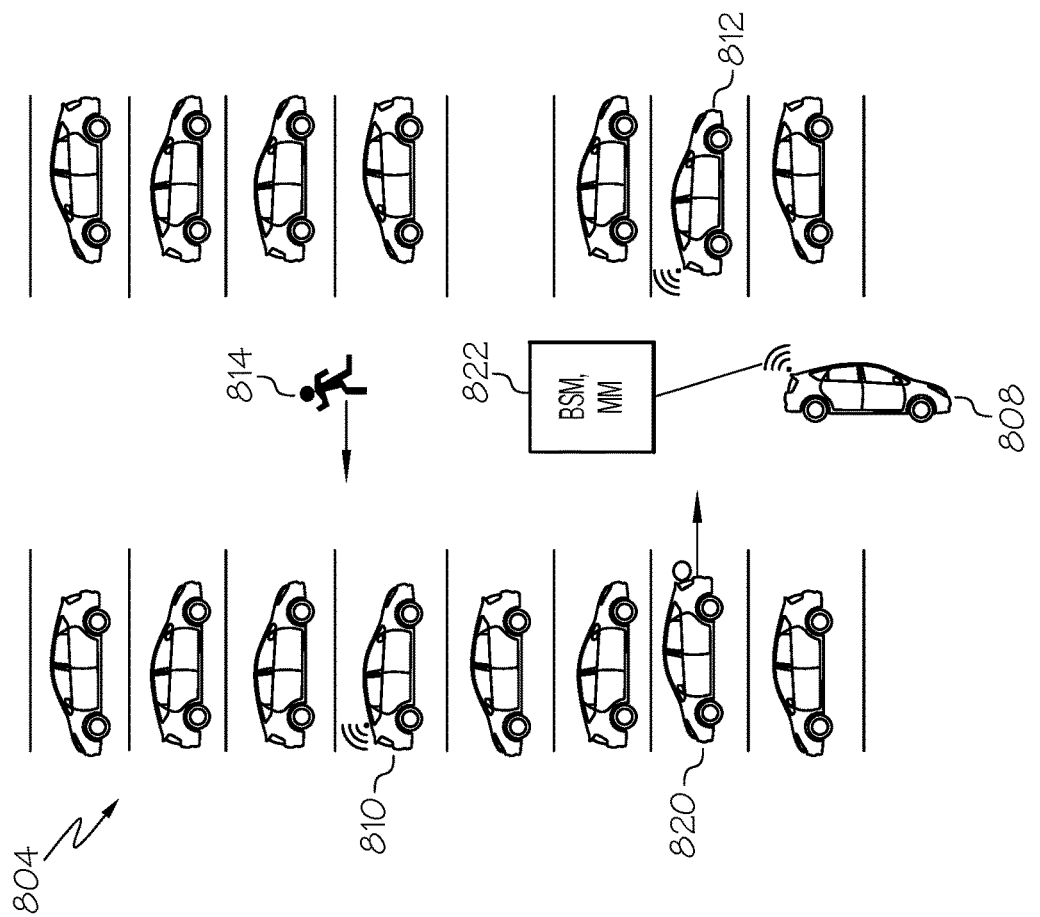
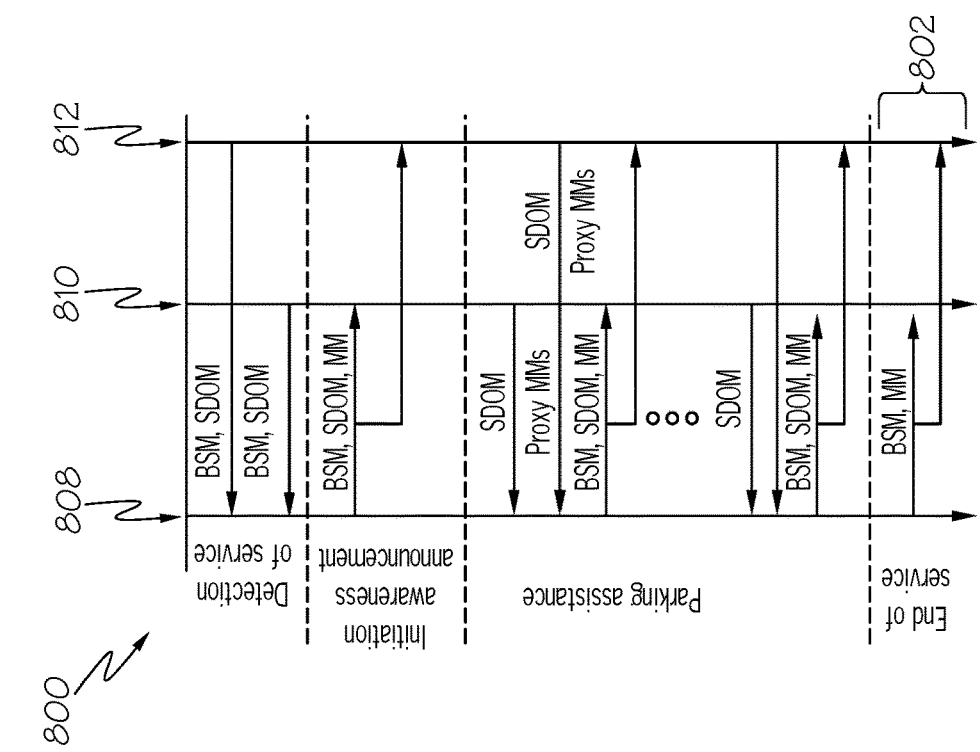
FIG. 8B
FIG. 8A

PARKING LOT AWARENESS ASSISTANCE USING CONNECTED VEHICLE COOPERATION

TECHNICAL FIELD

The present disclosure relates to vehicle collision avoidance, and more particularly to generating suggested trajectories to avoid potential collision on predicted trajectory.

BACKGROUND

About 20 percent of vehicle collisions occur in parking lots. Parking lots typically group a significant number of vehicles together in a small amount of space because they are typically configured to occupy just enough space to allow for vehicles to enter and exit parking spaces in the parking lot. Moreover, although vehicle traffic may be organized in a parking lot, pedestrian traffic is not as organized and can result in pedestrians entering into vehicle traffic.

Drivers may reduce their chances of being involved in a collision by driving slower and being more attentive to their surroundings. However, the limited space to maneuver and limited visibility of a parking lot limits the effectiveness that the attentiveness from a single perspective can have. Many parking lots have mirrors to improve a driver's visibility. However, mirrors are limited in the locations that they may be placed, often to corners of a parking lot. Parking lots could be fitted with cameras to transmit information to a vehicle. However, that would be time-consuming and expensive for the parking lot operator, especially considering that vehicles are increasingly being manufactured with cameras already equipped. Therefore, intelligent strategies for improving driver attention in a parking lot environment that can utilize data from cameras data from other connected vehicles are desired.

SUMMARY

In accordance with one embodiment of the present disclosure, a vehicle system includes a controller. The controller may be programmed to perform operations including identifying a subject in a conflict zone in a parking area by a sensor, determining a trajectory of a vehicle and a trajectory of the subject, determining a suggested trajectory for the vehicle based on a comparison of the trajectory of the vehicle and the trajectory of the subject, and transmitting the suggested trajectory to the vehicle.

In accordance with another embodiment of the present disclosure, a method includes identifying a subject in a conflict zone in a parking area by a sensor, determining a trajectory of a vehicle and a trajectory of the subject, determining a suggested trajectory for the vehicle based on a comparison of the trajectory of the vehicle and the trajectory of the subject, and transmitting the suggested trajectory to the vehicle.

Although the concepts of the present disclosure are described herein with primary reference to cars and parking lots, it is contemplated that the concepts will enjoy applicability to any other vehicle and vehicle storage area. For example, and not by way of limitation, it is contemplated that the concepts of the present disclosure will enjoy applicability to boats and marinas.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 5A depicts an example method for initiating service, according to one or more embodiments shown and described herein;

FIG. 5B depicts an example scenario of initiating service, according to one or more embodiments shown and described herein;

FIG. 6A depicts an example method for parking assistance in a parking space, according to one or more embodiments shown and described herein;

FIG. 6B depicts an example scenario of parking assistance in a parking space, according to one or more embodiments shown and described herein;

FIG. 8A depicts an example method for ending service, according to one or more embodiments shown and described herein; and FIG. 8B depicts an example scenario of ending service, according to one or more embodiments shown and described herein.

DETAILED DESCRIPTION

The embodiments disclosed herein include systems and methods for parking lot awareness assistance using connected vehicle cooperation. In embodiments disclosed herein, systems and methods may improve a driver's awareness of the parking lot environment with sensor (e.g., camera) data. However, rather than relying on the parking lot operator to install sensors in key areas of the parking area, the systems and methods presented herein leverage sensors pre-installed on connected vehicles that may be in the parking area. For example, connected vehicles may be autonomous and thus may be equipped with an array of sensors that can collect information that may be transmitted to other vehicles to improve their awareness of the parking lot environment.

Connected vehicles in a parking area may transmit messages to other connected vehicles in the parking lot to convey information about the parking area environment. The messages transmitted may be of classes including service detection messages (SDM), basic safety messages (BSM), sensor-detected object messages (SDOM), and maneuver messages (MM). SDMs are messages that include a notification that an assistance service is available. BSMs are messages that include current information, such as position, speed, size, static/dynamic information and/or the like of the transmitter vehicle.

SDOMs are messages that contain information (e.g., sensor information) about objects detected by the transmitter vehicle. SDOMs may include relative positions, velocities, sizes (bounding boxes) as well as other dynamic and static data regarding detected objects. SDOMs may include, but are not limited to, Collective Perception Message (CPM) or Sensor Data Sharing Message (MSCM). MMs are messages that include future information, such as future position, future speed, suture static/dynamic information, and/or the like of the transmitter vehicle. MMs may include, but not limited to, Maneuver Coordination Message (MCM) or Maneuver Sharing Coordination Message (MSCM). Proxy MMs are messages that contain future information and/or possible future information of an object detected by the transmitter vehicle.

Figure 1:
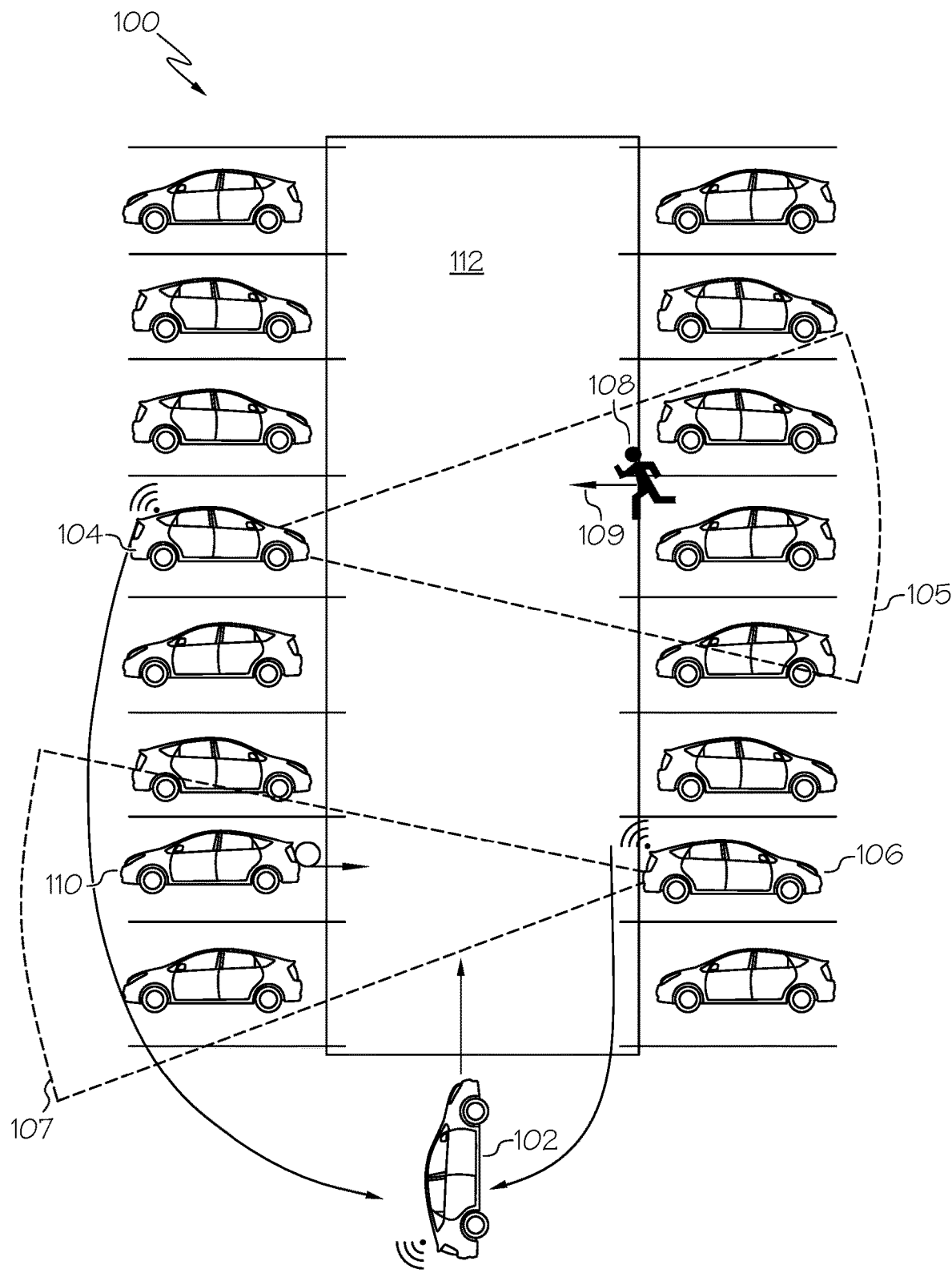
FIG. 1 depicts an example cooperative parking lot awareness assistance scenario, according to one or more embodiments shown and described herein.

Referring now to FIG. 1, an example cooperative parking lot awareness assistance scenario 100 is depicted. The scenario 100 includes a conflict zone 112 in a parking lot. The parking lot includes a plurality of vehicles, such as ego vehicle 102, connected vehicles 104, 106 and non-connected vehicles, as well as a pedestrian 108. The ego vehicle 102 may also be a connected vehicle, and as such can receive messages from other connected vehicles in the parking lot to augment the sensory information of the ego vehicle 102. The conflict zone 112 may be an area where the trajectory of the ego vehicle 102 may be in conflict with the trajectories of other objects such as the connected vehicles 104, 106, non-connected vehicles and the pedestrian 108. The conflict zone 112 may be determined based on the expected trajectory of the ego vehicle 102. The conflict zone 112 may be changed and updated in real time based on the trajectory of the ego vehicle 102.

As the ego vehicle 102 enters the conflict zone 112 of the parking lot, it may detect whether a parking lot awareness assistance service is available. This can be done in a decentralized manner by detecting messages coming from connected vehicles 104, 106 in the parking lot. Additionally or alternatively, this can be done in a centralized manner by detecting a server or microcloud that is responsible for managing the service in the parking lot. In some embodiments, the connected vehicles 104, 106 and/or the server (depending on whether the system is centralized) may detect the ego vehicle 102 and transmit a message to the ego vehicle 102 notifying it that the parking lot awareness assistance service is available.

The connected vehicles 104, 106 in the parking lot may monitor for subjects in the direction of the conflict zone 112. For example, the connected vehicle 104 may have a sensor coverage 105 in the direction of the conflict zone 112, which may be a front-facing camera because the connected vehicle 104 is facing the conflict zone 112. As another example, the connected vehicle 106 may have a sensor coverage 107 in the direction of the conflict zone 112, which may be a rear-facing camera because the connected vehicle 106 is facing away from the conflict zone 112. It should be understood that the conflict zone 112 is not limited to the area between rows of parking spaces but may also include any location in the parking lot where vehicles may pass to access parking spaces and/or locations that often contain pedestrians leaving or returning from their parked vehicles (e.g., a crosswalk).

In the parking lot awareness assistance service, connected vehicles 104, 106 may detect vehicles, pedestrians, and any other subject that the ego vehicle 102 might not be aware of. The connected vehicles 104, 106 may also alert the ego vehicle 102 by way of SDOMs that may contain sensor information regarding the detected subject, proxy MMs that predict the motion of the detected subject, or any other message to warn the ego vehicle 102 of subjects to be aware of. For example, connected vehicle 104 may transmit SDOMs to indicate the location of the pedestrian 108 and MMs to indicate that the pedestrian 108 is moving in a trajectory 109, which the ego vehicle 102 may not be able to determine from its current location given the distance between the ego vehicle 102 and the pedestrian 108 as well as a parked vehicle blocking the view of the pedestrian 108 from the vehicle 202. As another example, connected vehicle 106 may transmit SDOMs to indicate the location of parked vehicle 110 and MMs to indicate that the parked vehicle 110 is reversing towards the conflict zone 112. Specifically, the connected vehicle 106 may determine that the reverse light of the parked vehicle 110 that is a non-connected vehicle is on using the rear-facing camera of the connected vehicle 106, and transmit MMs to the ego vehicle 102 that the parked vehicle 110 is reversing toward the conflict zone 112. In some embodiments, the pedestrian 108 carries a mobile device such as a smartphone, a key fob, or any other smart device that can communicate with the ego vehicle 102 and/or the connected vehicles 104, 106. The mobile device of the pedestrian 108 may transmit is current location and moving direction to the ego vehicle 102 and/or the connected vehicles 104, 106.

Given the tight spaces of a parking lot, the sooner the ego vehicle 102 can become aware of a subject, then the sooner the ego vehicle 102 can modify its driving behavior to avoid conflict. However, some subjects are more critical than others. The criticality of a subject may depend on the attributes of the parking lot such as size, shape, occupancy, and any other attribute. The criticality of a subject may also or instead depend on attributes of the subject such as distance from the ego vehicle 102, speed, size, location, or any other attribute. For example, critical subjects be any moving subject in the parking lot, a subject in the conflict zone 112, a subject with a trajectory intersecting with the trajectory of the ego vehicle 102, and any other subject that may present a risk of collision with the ego vehicle 102.

Figure 2:
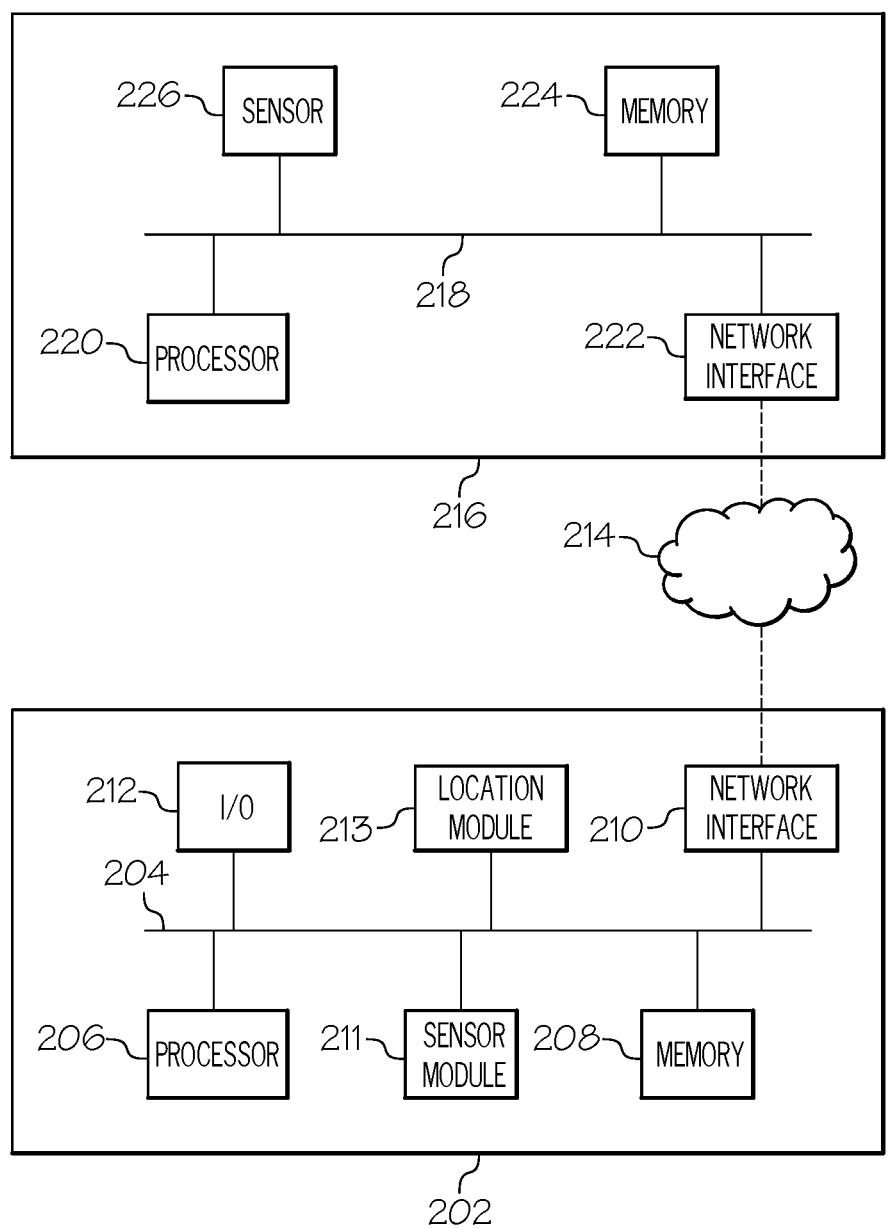
FIG. 2 depicts an example system including an example vehicle and example server, according to one or more embodiments shown and described herein.

Referring now to FIG. 2, an example system including an example vehicle 202 and example server 216 is depicted. The example vehicle 202 may be a connected vehicle. The vehicle 202 may be an automobile such as a terrestrial vehicle, an aquatic vehicle, an aerial vehicle, or any other passenger or non-passenger vehicle. In some embodiments, the vehicle is an autonomous vehicle that navigates its environment with limited or no human input. The vehicle 202 may include a processor 206, a memory module 208, an input/output module 212 (i.e., I/O module 212), a sensor module 211, a location module 213, and a network interface module 210. The vehicle 202 also may include a communication path 204 that communicatively connects the various components of the vehicle 202.

The processor 206 may include one or more processors that may be any device capable of executing machine-readable and executable instructions. Accordingly, each of the one or more processors of the processor 206 may be a controller, an integrated circuit, a microchip, or any other computing device. The processor 206 is coupled to the communication path 204 that provides signal connectivity between the various components of the connected vehicle. Accordingly, the communication path 204 may communicatively couple any number of processors of the processor 206 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 204 may be formed from any medium that is capable of transmitting a signal such as, e.g., conductive wires, conductive traces, optical waveguides, and the like. In some embodiments, the communication path 204 may facilitate the transmission of wireless signals, such as Wi-Fi, Bluetooth®, Near-Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory module 208 is coupled to the communication path 204 and may contain one or more memory modules comprising RAM, ROM, flash memories, hard drives, or any device capable of storing machine-readable and executable instructions such that the machine-readable and executable instructions can be accessed by the processor 206. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory module 208. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory module 208 may contain instructions for performing methods described herein. The memory module 208 may also contain machine-readable instructions for identifying objects in sensor data.

The input/output module 212, or I/O module 212, is coupled to the communication path 204 and may contain hardware for receiving input and/or providing output. Hardware for receiving input may include devices that send information to the processor 206. For example, a keyboard, mouse, scanner, touchscreen, and camera are all I/O devices because they provide input to the processor 206. Hardware for providing output may include devices from which data is sent. For example, an electronic display, speaker, and printer are all I/O devices because they output data from the processor 206.

The vehicle 202 also comprises a network interface module 210 that includes network connectivity hardware for communicatively coupling the vehicle 202 to other network-attached devices, such as connected vehicles, connected infrastructure, and the like. The network interface module 210 can be communicatively coupled to the communication path 204 and can be any device capable of transmitting and/or receiving data via a network 214 or other communication mechanisms. Accordingly, the network interface module 210 can include a communication transceiver for sending and/or receiving any wired or wireless communication. For example, the network connectivity hardware of the network interface module 210 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The vehicle 202 may connect with one or more other connected vehicles and/or external processing devices (e.g., an edge server, a cloud server) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A location module 213 is coupled to the communication path 204 such that the communication path 204 communicatively couples the location module 213 to other modules of the vehicle 202. The location module 213 may comprise one or more antennas configured to receive signals from global positioning system (GPS) satellites or any other satellite system. Specifically, in one embodiment, the location module 213 includes one or more conductive elements that interact with electromagnetic signals transmitted by GPS satellites. The received signal is transformed into a data signal indicative of the location (e.g., latitude and longitude) of the location module 213, and consequently, the vehicle 202.

The sensor module 211 is coupled to the communication path 204 and communicatively coupled to the processor 206. The sensor module 211 may include, e.g., LiDAR sensors, RADAR sensors, optical sensors (e.g., cameras), laser sensors, proximity sensors, location sensor, and the like. In embodiments, the sensor module 211 may monitor the surroundings of the vehicle 202 and may detect other vehicles and/or traffic infrastructure.

The server 216 may generally include components such as a processor 220, a memory module 224, a network interface module 222, and a communication path 218. Each component of the server 216 is similar in structure and function to its counterpart of the vehicle 202, described in detail above and will not be repeated. The server 216 may be a cloud server, edge server, a microcloud, or the like for use in centralized embodiments. The server 216 may be communicatively coupled to one or more connected vehicles, such as the vehicle 202, via a network 214. The network 214 may be a wide area network, a local area network, a personal area network, a cellular network, a satellite network, and the like. The server 216 may be local or remote from a parking lot and may service one or more parking lots. In some embodiments, the server 216 may have a coverage area wherein the sensor module 211 of the server 216 can capture data in a parking lot.

Figure 3:
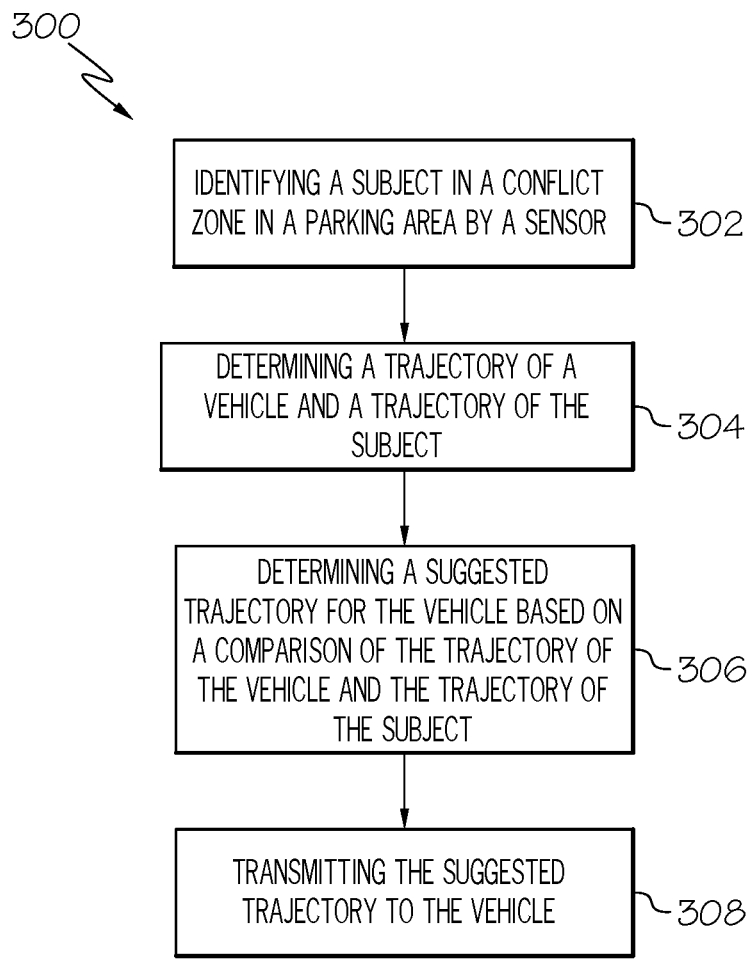
FIG. 3 depicts an example method, according to one or more embodiments shown and described herein.

Referring now to FIG. 3, an example method 300 is depicted. The method 300 is a cooperative service that can be managed in a centralized and/or decentralized manner. In a centralized service, a server (e.g., server 216) may define the boundaries of one or more service areas (e.g., the parking lot and critical areas therein) and is responsible for monitoring the service and notifying connected vehicles nearing or in the service area whether the service is available. A model of the parking lot can be stored on the server and be periodically updated by connected vehicles in or nearing a service area.

In block 302, a subject in a conflict zone in a parking area is identified by a sensor. The subject may be a vehicle, a pedestrian, an object, or any other subject found in the parking area. The subjects identified may be identified in an order of priority based on a level of criticality, wherein subjects determined to be more critical may have a higher priority than subjects that are not determined to be critical. Critical subjects may be any moving subject in the parking lot, a subject in the conflict zone 112, a subject with a trajectory intersecting with the trajectory of the ego vehicle 102, and any other indication that a subject may present a risk of collision with the ego vehicle 102.

The parking area may be any area having multiple parked vehicles. The parking area may be determined dynamically or may be predetermined. For example, a dynamically determined parking area may be an unpaved area where vehicles are gathered to park and a predetermined parking area may be a parking structure such as a garage or other paved space. A conflict zone may be one or more areas within a parking area where vehicles navigate to get to parking spaces. This may also be determined dynamically or may be predetermined. For example, a dynamically determined parking area may be areas where a vehicle is not parked (e.g., in an unpaved parking area) or may be areas between rows of designated parking spots (e.g., in a parking structure). The purpose of identifying conflict zones is to focus the system's attention on where conflict is most likely to occur.

The sensor may be any kind of sensor (e.g., sensors 211, 226) for detecting a subject. Sensor may include imaging sensors, LIDAR sensors, and the like. In the case of a decentralized system, the sensor may belong to a connected vehicle that is not the ego vehicle. For example, the sensor may belong to a parked connected vehicle to monitor an area of the parking area that the ego vehicle cannot detect. In the case of a centralized system, the sensor may belong to a server and/or components communicatively connect to the server monitoring the parking area.

In some embodiments, block 302 is performed only in response to approval from the ego vehicle. A connected vehicle and/or a server may transmit an offer of an awareness assist service to the ego vehicle. The offer may be in response to the ego vehicle approaching or entering the parking area. The offeror (i.e., the connected vehicle and/or server) may receive an acceptance of the offer from the vehicle. For example, the offer may appear on a display in the ego vehicle and the user may accept on the display (e.g., via I/O module 212). The connected vehicle and/or server may then begin identifying the subject in the conflict zone associated with the vehicle in response to receiving the acceptance.

In block 304, a trajectory of a vehicle and a trajectory of the subject are determined. The trajectory of a vehicle may be the trajectory of the ego vehicle including direction, speed, location, and/or any other positional attribute over time. Similarly, the trajectory of the subject may include direction, speed, location, and/or any other positional attribute over time.

In the case of a decentralized system, one or more connected vehicles that are not the ego vehicle may determine the trajectories. For example, multiple connected vehicles that can detect the subject and/or ego vehicle may determine the trajectory of the subject and/or ego vehicle. In some embodiments, the connected vehicle determining the trajectory of the ego vehicle does not need to detect the ego vehicle because the ego vehicle may share information regarding its trajectory with the connected vehicle. Utilizing multiple connected vehicles may increase the number of trajectories that can be determined at any moment, which can be shared among connected vehicles. Utilizing multiple connected vehicles may also allow for the determination of more complete trajectories (e.g., determined trajectories over 50 feet rather than 10 feet). In the case of a centralized system, the server may have a sensor to generate sensor data and/or receive sensor data from connected vehicles in its service area and may determine trajectories therefrom.

In block 306, a suggested trajectory for the vehicle is determined based on a comparison of the trajectory of the vehicle and the trajectory of the subject. A connected vehicle and/or a server may compare the trajectory of the ego vehicle and the trajectory of the subject. In response to the comparison of the trajectory of the vehicle and the trajectory of the subject identifying potential for conflict, the connected vehicle and/or the server may generate a suggested trajectory. That is, a trajectory that avoids the potential for conflict between the ego vehicle and the subject may be generated. A potential for conflict may be a likelihood of a collision between the ego vehicle and the subject. The suggested trajectory may include a direction and/or speed over time such that the potential for conflict between the ego vehicle and the subject is avoided. For example, if the trajectories determined in block 304 intersect at the same period of time, the suggested trajectory may reduce the speed of the ego vehicle and/or change the direction of the ego vehicle such that the trajectories no longer intersect at the same period of time.

In some embodiments, determining the suggested trajectory for the ego vehicle is in response to the trajectory of the ego vehicle entering the conflict zone. This may reduce the stress on the computing and network hardware by limiting the determination of suggested trajectories to when they are more likely to be utilized. Other limitations may also include determining whether the ego vehicle can identify the subject in the conflict zone and determining the suggested trajectory for the vehicle in response to determining that the ego vehicle cannot identify the subject in the conflict zone.

In some embodiments, the connected vehicle and/or server may continuously determine suggested trajectories for the ego vehicle until the service between the connected vehicle and/or server and the ego vehicle has ended. For example, the connected vehicle and/or server may determine suggested trajectories until the ego vehicle is exiting the conflict zone or cancels service. As another example, the connected vehicle and/or server may continue to determine a suggested trajectory as long as the trajectory of the ego vehicle and the trajectory of the subject are in the conflict zone.

In block 308, the suggested trajectory is transmitted to the ego vehicle. The trajectory may be transmitted to the ego vehicle directly from the source of the suggested trajectory (e.g., the connected vehicle and/or the server) or from any intermediaries between the ego vehicle and the source. The suggested trajectory may be in the form of a proxy MM or any other kind of digital message. The suggested trajectory may be continuously transmitted to the ego vehicle in case of, for example, poor signal propagation in a parking structure or updates to the suggested trajectory. Continuous transmission may continue until the ego vehicle exits the conflict zone, cancels the service, or otherwise indicates it does not wish to continue receiving suggested trajectories. In some embodiments, the rate at which the suggested trajectory is transmitted to the ego vehicle may vary. For example, a rate of the transmitting of the suggested trajectory may be commensurate to the potential for conflict between the ego vehicle and the potential for conflict. Assuming the trajectories of the ego vehicle and the subject indicate a potential collision within 5 seconds, the connected vehicle and/or the server may transmit the suggested trajectory at a higher rate within the 5 second period to ensure that the ego vehicle can react to the suggested trajectory before the conflict.

The following description of FIGS. 4A-8B describes an example decentralized implementation of the method 300. Particularly, FIGS. 4A, 5A, 6A, 7A, 8A depict the communications between an ego vehicle and two connected vehicles in a parking area of otherwise non-connected vehicles. In addition, FIGS. 4B, 5B, 6B, 7B, 8B depict the scenarios corresponding to the communications between the ego vehicle and two connected vehicles in the parking area. In other embodiments (e.g., centralized embodiments), a server may perform similar tasks as the connected vehicles in the following descriptions. For example, a server may track the number of connected vehicles in the parking area, coverage of sensor area, battery life of connected vehicles, and any other information regarding the status of the service. The ego vehicles 408, 508, 608, 708, and 808 in FIGS. 4A-8B refers to the same ego vehicle, the connected vehicle 410, 510, 610, 710, 810 in FIGS. 4A-8B refers to the same connected vehicle, and the connected vehicle 412, 512, 612, 712, 812 in FIGS. 4A-8B refers to the same connected vehicle.

Figures 4A, 4B:
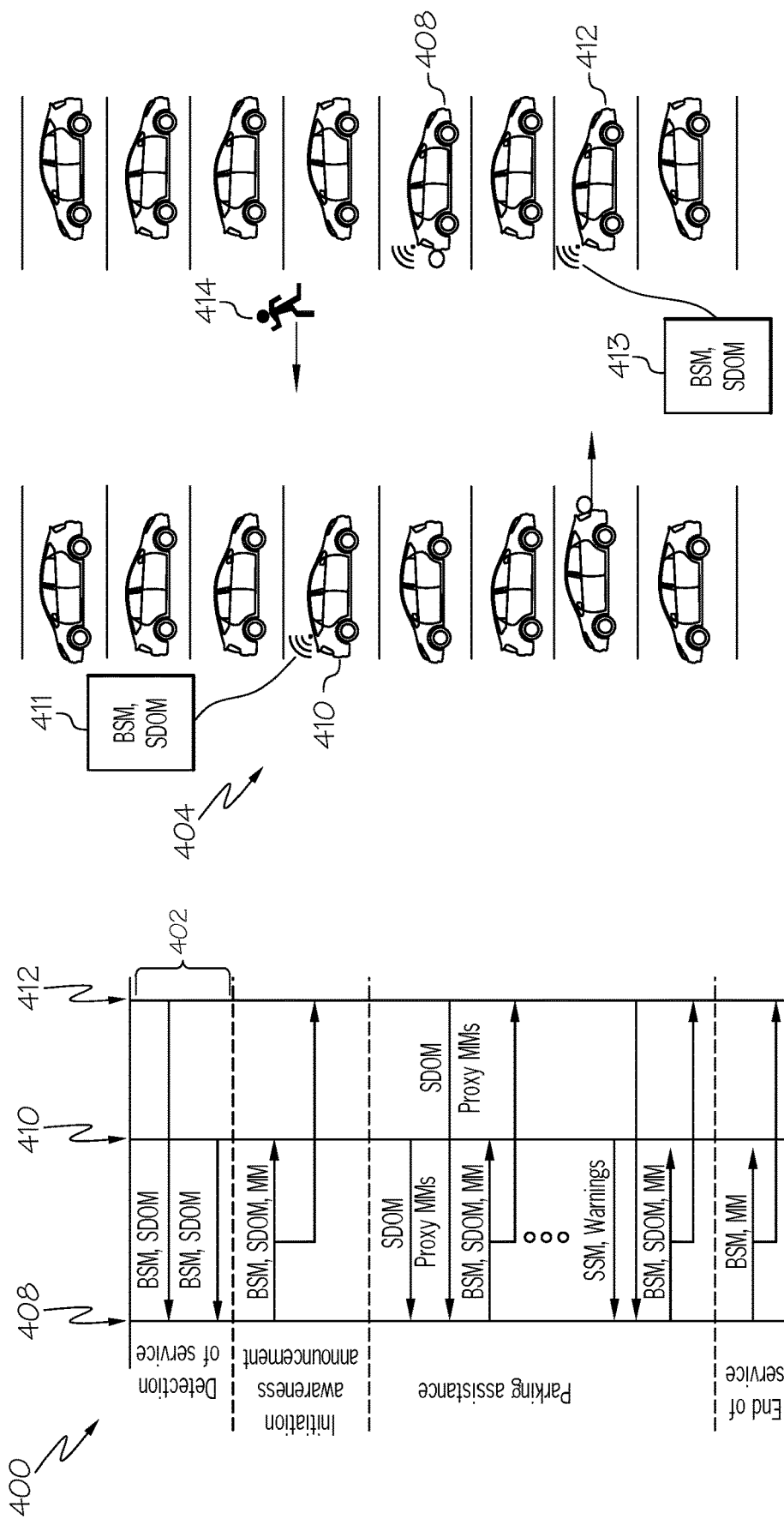
FIG. 4A depicts an example method for detection of service, according to one or more embodiments shown and described herein.
FIG. 4B depicts an example scenario of detection of service, according to one or more embodiments shown and described herein.

Referring now to FIGS. 4A and 4B, an example parking area 404 and example method 400 for detection of service is depicted. The method 400 may include a detection of service stage 402 for the ego vehicle 408. The connected vehicles 410, 412 in the parking area may broadcast the availability of the assistance service for the parking area 404. The messages may be in the form of SDOMs or SDMs in messages 411, 413 that may contain information about the service such as whether the service is centralized, the location of the parking area 404, the number of connected vehicles participating in the service, the cost of the service, the amount of traffic in the parking area 404, and any other data regarding the service and its availability. The messages 411, 413 may be broadcast in every direction so that any connected vehicle approaching the parking area 404 may be aware of the service.

In addition, the connected vehicles 410, 412 in the parking area 404 may transmit information about themselves. The information may be included in BSMs in messages 411, 413. The BSMs may contain information such as the position, speed, and any other current information regarding connected vehicles 410, 412. The connected vehicles 410, 412 in the parking area 404 may also transmit information about the objects they detect. The information may be included in SDOMs in messages 411, 413. The SDOMs may contain information such as the position, speed, and any other current information regarding detected objects, such as pedestrian 414. In some embodiments, at the detection of service stage 402, information regarding subjects, such as pedestrian 414, may not be transmitted directly to the ego vehicle 408. In some embodiments, the ego vehicle 408 may display a notice of the availability of service to the driver on an electronic display (e.g., via I/O module 212).

Referring now to FIGS. 5A and 5B, an example parking area 504 and example method 500 is depicted. The method 500 may include an initiation of service stage 502 for the ego vehicle 508. In stage 502, the ego vehicle 508 may broadcast its approval for use of the assistance service to the connected vehicles 510, 512. The approval may be in the form of an SDM in message 516. The message 516 may be broadcast in every direction so that any connected vehicle in the parking area 504 may be aware that ego vehicle 508 is participating in the cooperative service.

In addition, the ego vehicle 508 in the parking area 504 may transmit information about itself. The information may be included in BSMs in message 516. The BSMs contain information such as the position, speed, and any other current information regarding the ego vehicle 508. The information may also be included in MMs in message 516. The MMs contain information such as future position, speed, and/or any other future information regarding the ego vehicle 508. For example, the ego vehicle 508 may transmit MMs including its path 509. The information may also be included in SDOMs in message 516. The SDOMs contain sensor information from the ego vehicle 508. For example, the ego vehicle 508 may transmit SDOMs containing what it is sensing from a sensor view 518 of one or more of its sensors facing the critical zone. This may result in the connected vehicle 510 determining that the pedestrian 514 is critical because the pedestrian 514 cannot be seen by the ego vehicle 508 and because the trajectories of the pedestrian 514 and the ego vehicle 508 may intersect.

Referring now to FIGS. 6A and 6B, an example parking area 604 and example method 600 is depicted. The method 600 may include a parking assistance stage 602. In stage 602, the connected vehicles 610, 612 may use their sensors (e.g., cameras) to detect subjects. Subjects may include objects that may be critical to the ego vehicle 608, objects within a certain distance to the ego vehicle 608 and its trajectory 609, and/or objects that the connected vehicle 610, 612 estimate that the ego vehicle 608 cannot see. The connected vehicles 610, 612 may send SDOMs in messages 616, 618 including information regarding the detected subjects to share with other connected vehicles, including the ego vehicle 608.

The connected vehicles 610, 612 may also determine a trajectory for the subjects they can detect. For example, the connected vehicle 610 may determine a trajectory for the pedestrian 614 because the pedestrian 614 is in the view 611 of the connected vehicle 610, and the connected vehicle 612 may determine a trajectory for the vehicle 620 in the view 613 of the connected vehicle 612. The connected vehicles 610, 612 may also determine the trajectory 609 of the ego vehicle 608. The trajectory 609 may be based on a view of the ego vehicle 608 and/or the MM messages transmitted by the ego vehicle 608. In some embodiments, just one connected vehicle may determine the trajectory of the ego vehicle 608 and share it with the other connected vehicles in the parking area 604.

The connected vehicles 610, 612 may further compare the trajectory of the ego vehicle 608 and the trajectory of any subject. For example, a comparison of the trajectories of the pedestrian 614 and the ego vehicle 608 by the connected vehicle 610 may identify potential for conflict because the trajectories may intersect in the conflict zone, whereas a comparison of the trajectories of the reversing vehicle 620 and the ego vehicle 608 by the connected vehicle 612 may not identify potential for conflict. When the connected vehicles 610, 612 identify potential for conflict, the connected vehicles 610, 612 may transmit a warning to the ego vehicle 608.

Additionally or alternatively, the connected vehicles 610, 612 may determine and transmit a suggested trajectory to the ego vehicle 608. A suggested trajectory may be a trajectory that avoids the potential for conflict between the ego vehicle 608 and the pedestrian 614. The suggested trajectory may include a direction and/or speed over time such that the potential for conflict between the ego vehicle 608 and the pedestrian 614 is avoided. For example, the connected vehicle 610 may determine and transmit the suggested trajectory because it identified the potential for conflict, and it may determine that the ego vehicle 608 should reduce its speed to 0 until the pedestrian 614 has passed and potential for conflict is reduced. The connected vehicle 610 may update and transmit the suggested trajectory at a predetermined interval. In some embodiments, the rate of updating and transmitting may increase based on a level of criticality of the subject, a change in distance, and/or a change in speed. For example, if the position of a subject changes by more than 4 meters, then the connected vehicle sensing the subject may re-transmit the suggested trajectory. The suggested trajectory may be transmitted as proxy MMs because it is a suggested future speed and/or future position of the ego vehicle 608.

The ego vehicle 608 may continuously broadcast messages to connected vehicles in the parking area 604. The messages may include information to help the connected vehicles 610, 612 determine suggested trajectories for the ego vehicle 608. The information may include BSMs having the current speed and/or position of the ego vehicle 608, SDOMs having the subjects that the ego vehicle 608 can detect, and/or MMs having the future speed and/or future position of the ego vehicle 608.

Figure 7B:
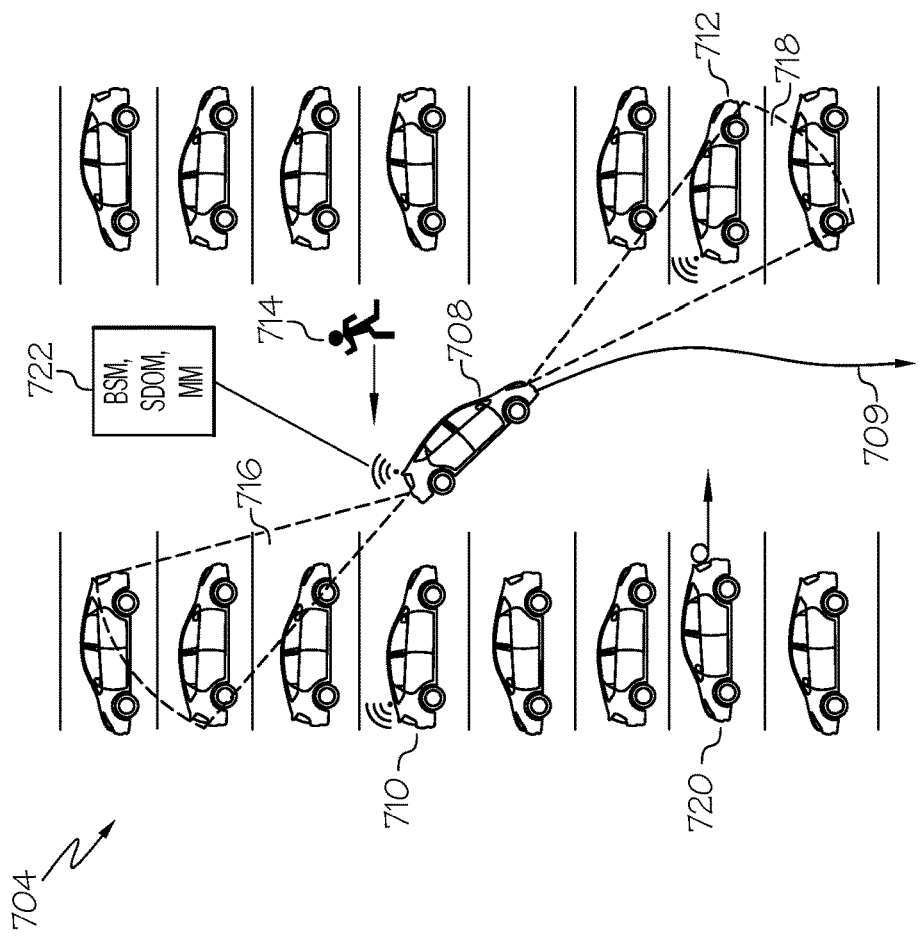
FIG. 7B depicts an example scenario of parking assistance navigating a parking lot, according to one or more embodiments shown and described herein.
Figure 7A:
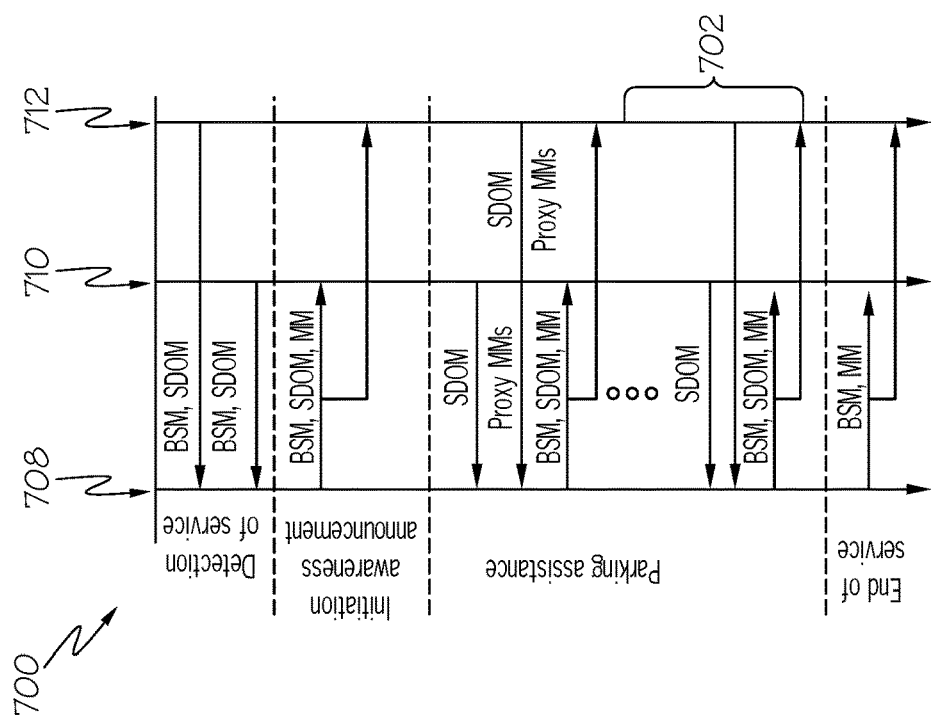
FIG. 7A depicts an example method for parking assistance navigating a parking lot, according to one or more embodiments shown and described herein.

Referring now to FIGS. 7A and 7B, an example parking area 704 and example method 700 is depicted. The method 700 may continue a parking assistance stage 702 until the end of service. In stage 702, the ego vehicle 708 may continuously broadcast messages including BSMs having the current speed and/or position of the ego vehicle 708, SDOMs having the subjects that the ego vehicle 708 can detect, and/or MMs having the future speed and/or future position over time of the ego vehicle 708 such as trajectory 709. Meanwhile, the connected vehicles 710, 712 may continuously identify subjects, such as pedestrian 714 and reversing vehicle 720. In this scenario, the connected vehicles 710, 712 may determine that the trajectory of the ego vehicle 708 does not create a potential for conflict with identified subjects. However, the views 716, 718 from the sensors of the ego vehicle 708 (e.g., the sensor module 211) as well as the SDOMs in the message 722 indicate that the ego vehicle 708 may not adequately be aware of the pedestrian 714 and the reversing vehicle 720. In which case, the connected vehicles 710, 712 may transmit SDOMs and/or warning messages to the ego vehicle 708 to increase the awareness of the ego vehicle 708.

Referring now to FIGS. 8A and 8B, an example parking area 804 and example method 800 is depicted. The method 800 may include an end of service stage 802 for the ego vehicle 808. In stage 802, the ego vehicle 808 may broadcast a message 822 to end the service. The message 822 may be broadcast in every direction so that any connected vehicle in the parking area 804 may be aware that the ego vehicle 808 is no longer participating in the cooperative service. The message 822 may be received by one or more connected vehicles and may be shared among other connected vehicles in the parking area 804 so the other connected vehicles are aware there is one less connected vehicle participating in the cooperative service.

In some embodiments, the end of service may be inferred. Inference of an end of service may be derived from the ego vehicle 808 leaving the parking area 804. End of service may be inferred from BSMs in the message 822 indicating that the ego vehicle 808 is no longer in the parking area 804 or MMs in the message 822 indicating that the ego vehicle 808 is exiting the parking area 804. End of service may also be inferred from a lack of messages transmitted by the ego vehicle 808 over a predetermined period of time.

It should now be understood that disclosed herein are systems and methods for parking lot awareness assistance using connected vehicle cooperation that may improve a driver's awareness of a parking lot environment with sensor data from other vehicles in the area. Connected vehicles in a parking lot may transmit messages to other vehicles in the parking lot to convey information such as the location and/or trajectory of identified subjects as well as suggested trajectories for a vehicle to avoid potential conflict with the identified. The system may be centralized or decentralized. In a centralized system, a server may coordinate the observations and communications of connected vehicles in the parking area. In a decentralized system, one or more connected vehicles in the parking area may share their observations and determine for other connected vehicles suggested trajectories based on their observations.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A vehicle system comprising:
 a controller programmed to perform operations comprising:
 receiving data from a sensor of a first connected vehicle parking in a parking area configured to operably monitor a conflict zone of the parking area;
 transmitting an offer of an awareness assist service to the second connected vehicle;
 receiving an acceptance of the offer from the second connected vehicle;
 identifying the non-vehicle subject in the conflict zone associated with the second connected vehicle in response to receiving the acceptance;
 identifying a non-vehicle subject and a second connected vehicle in the conflict zone based on the data received from the sensor configured to operably monitor the conflict zone;
 determining a trajectory of the second connected vehicle and a trajectory of the non-vehicle subject;
 determining a suggested trajectory for the second connected vehicle based on a comparison of the trajectory of the second connected vehicle and the trajectory of the non-vehicle subject; and
 operating the second connected vehicle according to the suggested trajectory.

2. The vehicle system of claim 1, wherein the trajectory of the second connected vehicle and the trajectory of the non-vehicle subject are in the conflict zone.

3. The vehicle system of claim 1, wherein determining the suggested trajectory for the second connected vehicle is in response to the second connected vehicle entering the conflict zone.

4. The vehicle system of claim 3, wherein the controller is programmed to perform operations further comprising determining the suggested trajectory and continuously transmitting the suggested trajectory until the second connected vehicle is exiting the conflict zone.

5. The vehicle system of claim 1, wherein:
 the comparison of the trajectory of the second connected vehicle and the trajectory of the non-vehicle subject identifies a potential for conflict; and
 the suggested trajectory avoids the potential for conflict between the second connected vehicle and the non-vehicle subject.

6. The vehicle system of claim 5, wherein the suggested trajectory includes direction over time such that the potential for conflict between the second connected vehicle and the non-vehicle subject is avoided.

7. The vehicle system of claim 5, wherein the suggested trajectory includes speed over time such that the potential for conflict between the second connected vehicle and the non-vehicle subject is avoided.

8. The vehicle system of claim 5, wherein a rate of transmitting of the suggested trajectory is determined based on the potential for conflict.

9. The vehicle system of claim 1, wherein the controller is programmed to perform operations further comprising:
 receiving sensor data from the second connected vehicle;
 determining whether the non-vehicle subject in the conflict zone is within a view of the second connected vehicle; and
 determining the suggested trajectory for the second connected vehicle in response to determining that the non-vehicle subject in the conflict zone is within a view of the second connected vehicle.

10. A method comprising:
 receiving data from a sensor of a first connected vehicle parking in a parking area configured to operably monitor a conflict zone of the parking area;
 transmitting an offer of an awareness assist service to the second connected vehicle;
 receiving an acceptance of the offer from the second connected vehicle;
 identifying the non-vehicle subject in the conflict zone associated with the second connected vehicle in response to receiving the acceptance;
 identifying a non-vehicle subject and a second connected vehicle in the conflict zone based on the data received from the sensor configured to operably monitor the conflict zone;
 determining a trajectory of the second connected vehicle different from the one or more connected vehicles and a trajectory of the non-vehicle subject;
 determining a suggested trajectory for the second connected vehicle based on a comparison of the trajectory of the second connected vehicle and the trajectory of the non-vehicle subject; and
 operating the second connected vehicle according to the suggested trajectory.

11. The method of claim 10, wherein the trajectory of the second connected vehicle and the trajectory of the non-vehicle subject are in the conflict zone.

12. The method of claim 10, wherein determining the suggested trajectory for the second connected vehicle is in response to the second connected vehicle entering the conflict zone.

13. The method of claim 12, further comprising determining the suggested trajectory and continuously transmitting the suggested trajectory until the second connected vehicle is exiting the conflict zone.

14. The method of claim 10, wherein:
 the comparison of the trajectory of the second connected vehicle and the trajectory of the non-vehicle subject identifies a potential for conflict; and
 the suggested trajectory avoids the potential for conflict between the second connected vehicle and the non-vehicle subject.

15. The method of claim 14, wherein the suggested trajectory includes direction over time such that the potential for conflict between the second connected vehicle and the non-vehicle subject is avoided.

16. The method of claim 14, wherein the suggested trajectory includes speed over time such that the potential for conflict between the second connected vehicle and the non-vehicle subject is avoided.

17. The method of claim 14, wherein a rate of transmitting of the suggested trajectory is determined based on the potential for conflict.

18. The method of claim 10, further comprising:
receiving sensor data from the second connected vehicle;
determining whether the non-vehicle subject in the conflict zone is within a view of the second connected vehicle; and
determining the suggested trajectory for the second connected vehicle in response to determining that the non-vehicle subject in the conflict zone is within the view of the second connected vehicle.

* * * * *